US008429619B2

(12) United States Patent
Albert et al.

(10) Patent No.: US 8,429,619 B2
(45) Date of Patent: Apr. 23, 2013

(54) EXECUTABLE HIGH-LEVEL TRACE FILE GENERATION SYSTEM

(75) Inventors: Jason T. Albert, Rochester, MN (US); Christopher J. Engel, Rochester, MN (US); John Farrugia, Austin, TX (US); Paul G. Van Leeuwen, Rochester, MN (US); Brent M. Wieman, Minneapolis, MN (US)

(73) Assignee: International Business Machines Corporation, Armonk, NY (US)

( * ) Notice: Subject to any disclaimer, the term of this patent is extended or adjusted under 35 U.S.C. 154(b) by 1576 days.

(21) Appl. No.: 11/772,895

(22) Filed: Jul. 3, 2007

(65) Prior Publication Data
US 2009/0013312 A1    Jan. 8, 2009

(51) Int. Cl.
*G06F 9/44*    (2006.01)
(52) U.S. Cl.
USPC .......................................................... 717/128
(58) Field of Classification Search ................... 717/106, 717/109, 115, 124, 127–129, 130; 719/310, 719/320; 709/218, 223, 320; 715/804, 513; 706/45; 716/106; 379/265.06; 455/425; 713/189; 703/22
See application file for complete search history.

(56) References Cited

U.S. PATENT DOCUMENTS

| | | | | |
|---|---|---|---|---|
| 5,870,607 A * | 2/1999 | Netzer | ........................... | 717/127 |
| 6,161,216 A * | 12/2000 | Shagam | ........................ | 717/128 |
| 6,658,646 B1 * | 12/2003 | Hernandez, III | ............... | 717/115 |
| 6,966,051 B2 | 11/2005 | McBrearty et al. | | |
| 6,978,444 B1 * | 12/2005 | Farchi et al. | ................... | 717/129 |
| 7,281,138 B1 * | 10/2007 | Di Benedetto | ............... | 713/189 |
| 2003/0131146 A1 * | 7/2003 | Lam et al. | ....................... | 709/320 |
| 2004/0006741 A1 * | 1/2004 | Radja et al. | .................... | 715/513 |
| 2004/0111727 A1 * | 6/2004 | Schwarzbauer et al. | ....... | 719/310 |
| 2005/0075856 A1 * | 4/2005 | Wozniak et al. | ................ | 703/22 |
| 2006/0126817 A1 * | 6/2006 | Beckett et al. | ............ | 379/265.06 |
| 2006/0212540 A1 * | 9/2006 | Chon et al. | ..................... | 709/218 |
| 2007/0157174 A1 * | 7/2007 | Gebhardt et al. | ............. | 717/124 |
| 2007/0234306 A1 * | 10/2007 | Klinger et al. | ................ | 717/128 |

OTHER PUBLICATIONS

Mesnier et al, "TRACE: Parallel trace replay with approximate causal events", Sep. 2006, CMU-PDL-06-108, p. 1-21 <TraceReplay_PDL06.pdf>.*

* cited by examiner

*Primary Examiner* — Tuan A Vu
(74) *Attorney, Agent, or Firm* — Mitch Harris, Atty at Law, LLC; Andrew M. Harris; Matthew B. Talpis

(57) ABSTRACT

An executable high-level trace file generation system provides reduced debugging effort and time, particularly on initial startup of new or modified hardware. An executable program invokes high-level application programming interfaces (APIs), to perform various tasks. Instructions within the APIs generate a trace file documenting the invoked sequence of APIs by writing a line to a trace file that documents the API and input parameters received by the API. Upon completion of execution of the API, the return value may be documented as a comment line in the trace file. The resulting trace file is then re-executable as a script and may be edited to alter the sequence of APIs invoked and/or the arguments provided. The script interpreter may be a command line interface through which the APIs are invoked, and trace files may be similarly generated that document sequences of manually entered commands.

16 Claims, 3 Drawing Sheets

EXECUTABLE HIGH-LEVEL TRACE FILE GENERATION SYSTEM

BACKGROUND OF THE INVENTION

1. Technical Field

The present invention relates generally to computing systems, and more particularly, to a method and system that generate a high-level trace file that can be modified and/or re-executed without requiring re-compilation.

2. Description of the Related Art

Certain operating and debugging processes in computer systems require repetitive and time-consuming debugging tasks that are exacerbated by the need to make minor changes and recompile executable program code. In particular, when hardware changes are made or complex new systems or processors are operated for the first time, the process of adapting existing software to the altered or new system typically requires multiple attempts at first startup, in which the startup sequence and software are often modified slightly to accommodate the hardware changes. Further, end users debugging startup of a system may not have access to the source code and compiler tools to make such changes.

Typically, each software change requires generation of new executable code after the modification is made. Such software is typically modular and includes a large number of pre-scripted operations that call application programming interfaces (APIs). However, even if individual modules that are unchanged can be linked from an unchanged object file, the compilation of altered modules and subsequent linking of the entire executable is a time-consuming operation.

One alternative to re-building an executable file during debugging is direct entry of the high-level procedure calls. However, such modification must be repeated each time it is needed, and does not provide a permanent record of the code changes that are needed. For example, if a particular procedure call needs to be skipped for a new processor, rather than rebuilding an executable file that controls commands sent to a program or processor that controls the startup sequence, a person who has the source code for the executable file may manually enter the sequence of procedure calls made by the executable file if a console is provided to accept them. After verifying that the modified sequence is correct, the program code must still be modified and re-built, or the tedious process of manually entering the startup sequence must be repeated on each startup.

The alternative is to modify and re-build the program code at each detection of a problem with the sequence, which can also be a tedious process, in particular if the first modification(s) are not correct. Another solution possible on some systems is to edit the machine code directly and save the modified machine code, but machine code is not readily comprehended and in particular, machine code generated by high-level compilers, such as highly-optimized machine code, is particularly hard to decipher. Further, machine code that calls high-level procedures gives no clue as to what steps the program code is performing, if there is no reference back to the high-level program source embedded in the executable file.

Therefore, it would be desirable to provide a method and system an alternative to re-building an executable file to make on-the-fly changes during debugging or entering an entire sequence of commands from a command line interface, thereby providing a machine-repeatable solution to a program flow that can be modified from the sequence produced by the executable file. It would further be desirable to provide such an alternative that provides ready comprehension of the code being changed by reference to high-level program code so that the sequence of commands can be modified without the user having the entire program source. It would further be desirable to provide such a system and method that provide a record of commands entered at a command line interface.

SUMMARY OF THE INVENTION

The objectives of providing an alternative to re-building an executable file to make on-the-fly changes during debugging, providing ready comprehension of the changes being made, a repeatable solution and with no requirement that the user have the actual program source are accomplished in a computer system and computer program product.

The computer system includes a processor that executes an executable program file that makes calls to application programming interfaces (APIs), that are re-usable sequences of program code that perform various tasks. At each call to particular APIs, if a trace enable parameter is set, the API call is documented in a trace file, along with any parameter information. The API program code is then executed, and then any return value(s) is documented in the trace file, generally as a comment line.

The documentation of the API calls and the return value comments provide a human-readable file that can be edited to change the sequence of execution produced by the executable file, without requiring the executable file source. A command line interface may also be provided by the system to permit manual entry of API calls, and the same mechanism used to produce a trace file. The command line interface may implement an API script file input function that provides for execution of the trace files generated by the system.

The system may be a maintenance/test workstation system that controls start-up, configuration and operation of a large-scale computer system via one or more service processor interfaces in the large-scale system that are coupled to the workstation system. The APIs may be procedures developed for sending commands and/or data to the service processor interface(s).

The foregoing and other objectives, features, and advantages of the invention will be apparent from the following, more particular, description of the preferred embodiment of the invention, as illustrated in the accompanying drawings.

BRIEF DESCRIPTION OF THE DRAWINGS

The novel features believed characteristic of the invention are set forth in the appended claims. The invention itself, however, as well as a preferred mode of use, further objectives, and advantages thereof, will best be understood by reference to the following detailed description of an illustrative embodiment when read in conjunction with the accompanying drawings, wherein like reference numerals indicate like components, and:

DESCRIPTION OF ILLUSTRATIVE EMBODIMENT

The present invention concerns a technique for generating a trace file that may be edited and re-executed as a script for replicating a sequence of high-level application programming interface (API) calls made by an executable (machine code) program. The trace file documents, in human-readable form, particular API calls for which the trace functionality is provided. The trace file includes a line for each API call with the arguments provided to that API call documented as immediate values (constants). The return values yielded by the API calls are documented as comments after the API call has returned. The resultant trace file provides flexibility in debugging systems for which the source code is not distributed and/or the ability to quickly modify a sequence of API calls without requiring re-compiling the executable program or manually entering a long sequence of command line commands that invoke the APIs. For example, a startup/maintenance module for a large-scale server system may be either operated by entering hundreds of commands to a command-line interface, or automatically operated by various executable programs that invoke procedures that communicate with one or more service processors. By generating a trace file as described above, the startup or other sequence for the system may be generated as a script and then quickly edited to make changes at test, or in the field, to perform debugging or to modify maintenance operations on-the-fly.

Figure 1:
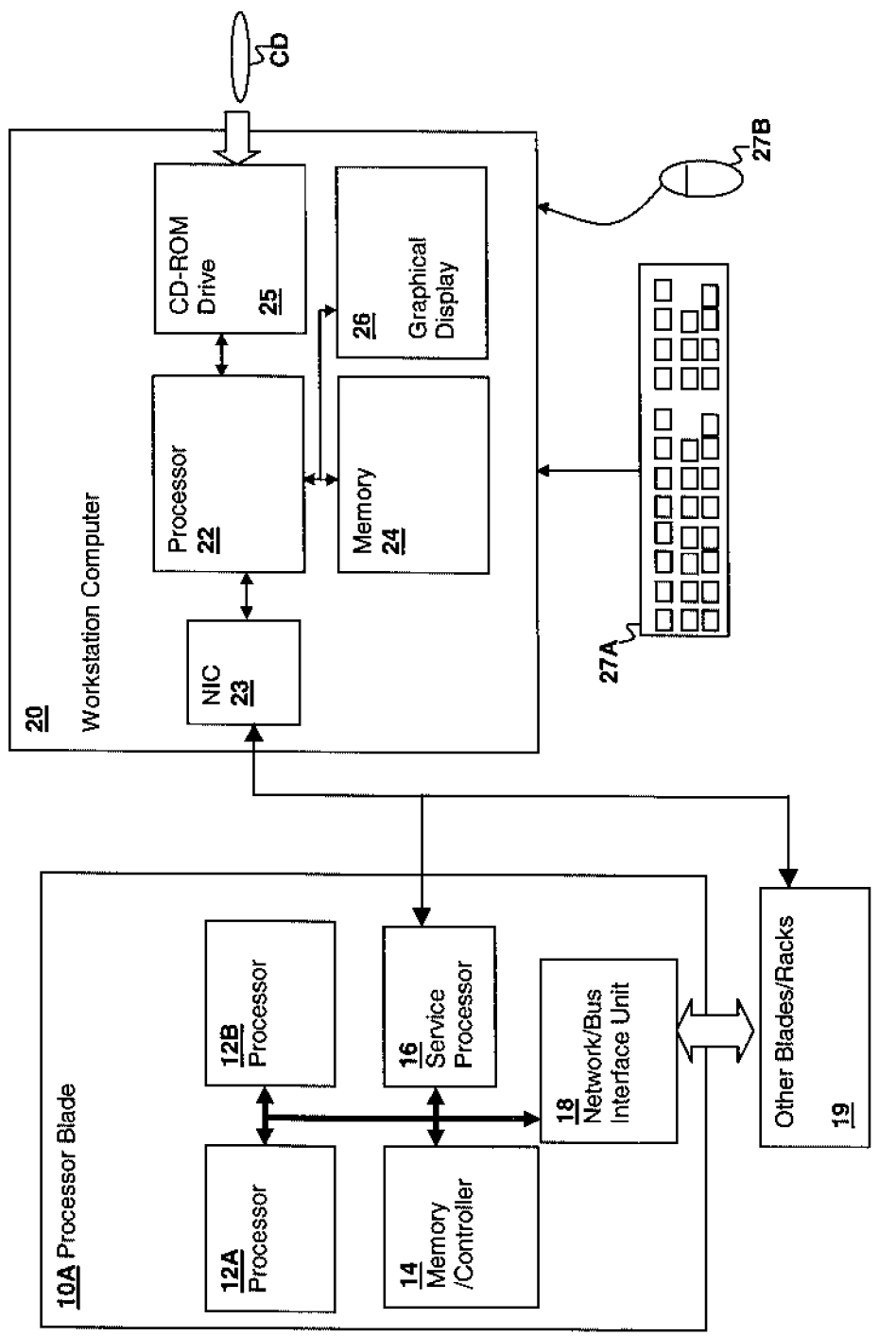
FIG. 1 is a block diagram of a computer system in accordance with an embodiment of the invention.

Referring now to FIG. 1, a system in accordance with an embodiment of the present invention is shown. The illustrated system depicts an example of how the invention may be applied and should not be construed as a limitation on the type of system or application to which the invention is applicable. A processor blade 10A includes processors 12A and 12B, that generally have multiple cores, coupled to a memory/memory controller module 14 a network/bus interface unit 18, and a service processor 16 that controls units within processor blade 10A to control startup, shutdown and perform other maintenance tasks. Processor blade 10A is also coupled via a network or bus connection from network/bus interface unit 18 to other blades and/or racks of blades 19. Service processor 16 is coupled to a workstation computer 20 via a port such as an Ethernet interface that is coupled via network interface controller (NIC) 23 to a workstation processor 22. Workstation computer 20 also includes a workstation memory 24, a CD-ROM drive 25 for loading program products and/or data stored on computer-readable media such as compact disc CD. User input is provided by a keyboard 27A and a mouse 27B or other pointing device and graphical output, such as listings or editor interfaces for editing the trace file of the present invention, is provided by a graphical display 26 coupled to workstation processor 22.

In the exemplary embodiment, a trace file is generated for executable programs executed by workstation processor 22 that call high-level APIs that communicate with service processor 16 via NIC 23 to manipulate processor blade 10A and other blades/racks 19. However, the present invention may also apply to executable programs executing on, for example, a stand-alone computer such as a system taking the form of workstation computer 20, when not connected to processor blade 10A and other blades/racks 19, and there is no requirement that the APIs are system service APIs. For example, the present invention may be used to provide an executable trace file from a general-purpose application executing on a personal computer that provides for user manipulation of data within a personal computer operating system.

Figure 2:
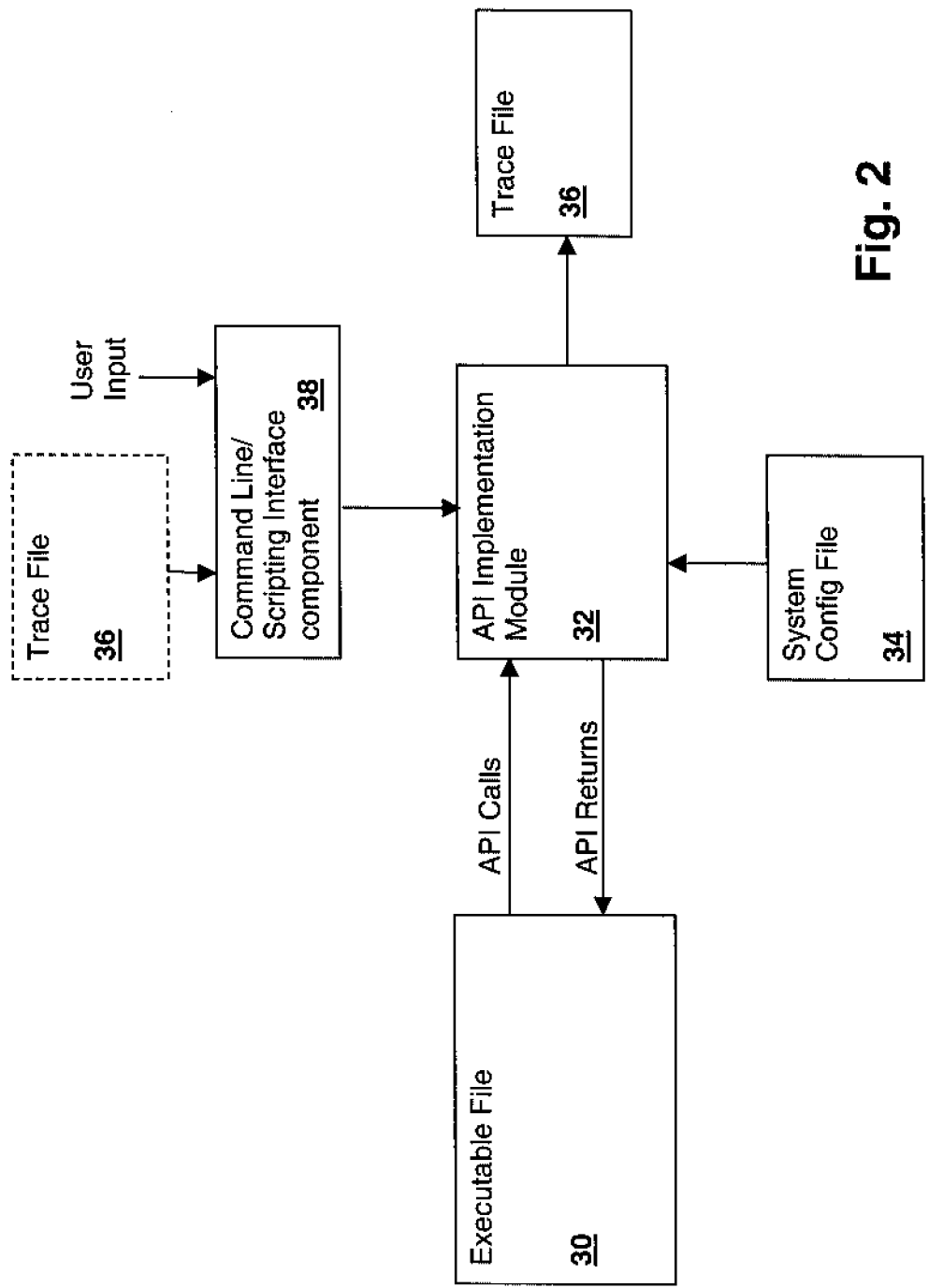
FIG. 2 is a block diagram showing the arrangement of software modules in a computing system in accordance with an embodiment of the invention.

Referring now to FIG. 2, a block diagram showing an organization of software modules in accordance with an embodiment of the present invention is shown. An executable file 30 generates API calls to an API implementation module 32 and receives API return values. API implementation module 32 may be a dynamically linked library (DLL), another executable module that receives arguments as command line parameters, a statically-linked library module that is embedded within executable file 30, or any other suitable mechanism such as an interpretive environment, that provides for the execution of procedures from executable code. Executable file 30 may be a native machine code program such as a C, or C++ program, or a higher-level interpreted file such as a PERL (promulgated by the PERL Foundation), JAVA (a trademark of Sun Microsystems, Inc.), RUBY or other suitable interpreted or compiled language.

When API implementation module 32 receives an API call, a system configuration file (or data structure loaded from a system configuration file) is checked to determine whether or not a TRACE ENABLED value is set. If the TRACE ENABLED value is set, then the API call is documented, along with the values of the arguments provided, to trace file 36, which is human-readable and generally a text file listing the particular API and the arguments. For example, a call to API_MachineInit (rackno, bladeno, coreno, initflags) might be documented in the trace file as:

MachineInit 0 0 0 0×80000000 where MachineInit is a command line command that can alternatively be provided to a command line/scripting interface component 38 that will generate the same API call for the same arguments and the values following MachineInit in the trace file are the values of rackno, bladeno, coreno and initflags that were provided from executable file 30 as parameters to the API call.

API implementation module 32 then executes the program instructions that form the API itself, and just before returning program control to executable file 30 and returning any API return value, API implementation module 32 writes a comment line with the return value(s), for example in a pound-sign prefixed text line such as:

MachineInit returned ERR_SUCCESS

Where ERR_SUCCESS was the return value provided from the called API and # is a prefix that causes command line/scripting interface component 38 to ignore the line as a comment.

Command line/scripting interface component 38 accepts user input via a command-line interface and the generated trace file 36, which may be user-edited via a dedicated or general-purposes editing program such as a text editor. For example, command line/scripting interface component 38 may accept a command such as:

EXECUTE (tracefilename)

so that upon being given the filename of trace file 36, feeds the sequence of documented API calls to API implementation module 32, re-generating the sequence of API calls originally generated by executing executable file 30, but with any changes in the sequence or parameters (arguments) that were introduced by editing trace file 36. For example, assume that in the system of FIG. 1, an executable file 30 is executed by workstation computer 20 to initialize all of the processor cores, according to the following C++ program:

```
int NumRacks;
int NumBlades[MAX_BLADES];
int NumCores[MAX_BLADES, MAX_CORES];
/* enumerate cores on all blades and racks */
NumRacks = EnumerateRacks( )
for( int i=0; i < NumRacks; i++)
{
    NumBlades[i] = EnumerateBlades(i);
    for( int j = 0; j < NumBlades[i]; j++)
        NumCores[i,j] = EnumerateCores(i,j);
}
```

```
/* initialize all cores */
for( i=0; i < NumRacks; i++ )
{
    for( j=0; j < NumBlades[i]; j++ )
    {
        for( int l=0; l < NumCores[i,j]; l++ )
            MachineInit( i, j, l, 0x80000000);
    }
}
/* load test application */
for( i=0; i < NumRacks; i++ )
{
    for( j=0; j < NumBlades[i]; j++ )
    {
        for( l=0; l < NumCores[i,j]; l++ )
            LoadTestApp( i, j, l);
    }
}
```

The generated trace file would resemble the following (with ellipsis representing lines deleted for brevity):

```
EnumerateRacks
# EnumerateRacks returned 1
EnumerateBlades 0
# EnumerateBlades returned 4
EnumerateCores 0 0
# EnumerateCores returned 2
EnumerateCores 0 1
# EnumerateCores returned 2
EnumerateCores 0 2
# EnumerateCores returned 2
EnumerateCores 0 3
# EnumerateCores returned 2
MachineInit 0 0 0 0x80000000
# MachineInit returned ERR_SUCCESS
MachineInit 0 0 1 0x80000000
# MachineInit returned ERR_SUCCESS
...
MachineInit 0 1 1 0x80000000
# MachineInit returned ERR_NORESPONSE
...
MachineInit 0 3 1 0x80000000
# MachineInit returned ERR_SUCCESS
LoadTestApp 0 0 0
# LoadTestApp returned ERR_SUCCESS
...
LoadTestApp 0 1 1
# LoadTestApp returned ERR_HWFAIL
...
LoadTestApp 0 3 1
# LoadTestApp returned ERR_SUCCESS
```

Assume the rack system including processor blade 10A and other blades/racks 19, but not workstation computer 20, locks up due to execution of the API reflected by the line in the trace file that reads "LoadTestApp 0 1 1". By modifying the resultant trace file to delete the line that reads "LoadTestApp 0 1 1" in the trace file, or all reference to rack 0, blade 1 and core 1, the system can be brought up temporarily for further debugging by providing the edited trace file to command line/scripting interface component 38, without having to compile a special test program, alter the hardware, or having access to the source code that generates executable file 30.

Figure 3:
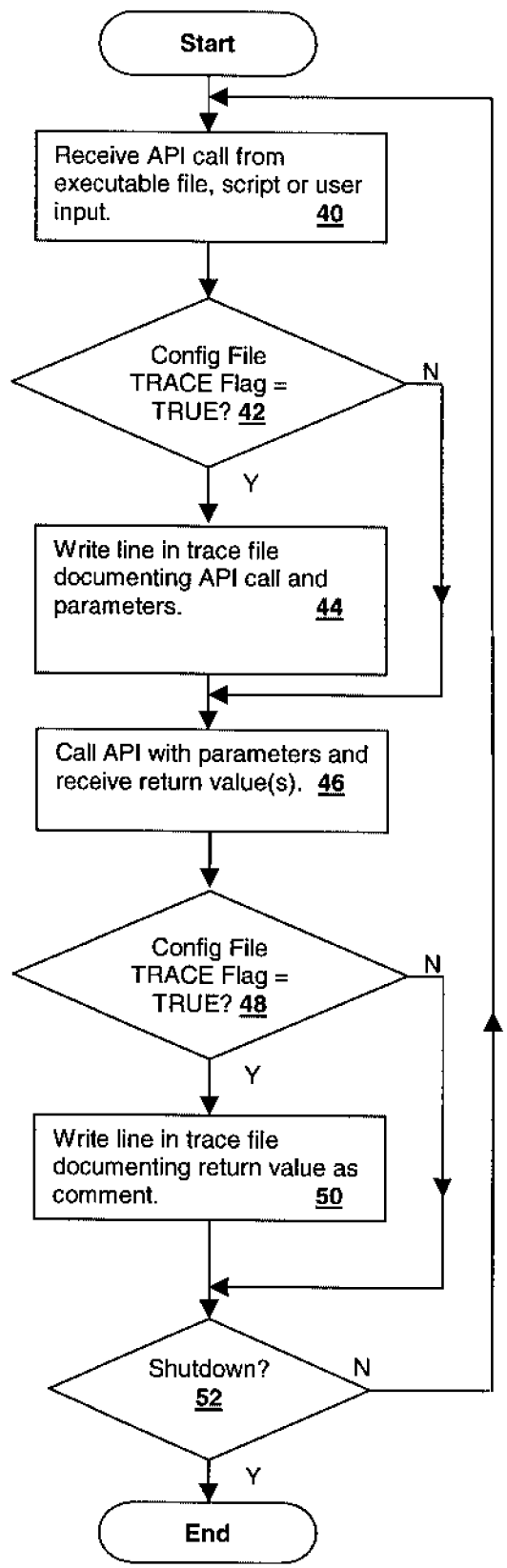
FIG. 3 is a flowchart depicting a method in accordance with an embodiment of the present invention.

Referring now to FIG. 3, a computer-performed method in accordance with an embodiment of the present invention is illustrated in a flowchart. For each API call received from the executable file, script or user input (step 40) for which tracing is supported, the TRACE flag is checked for an asserted condition (decision 42) and if the TRACE flag is set, a line is written in the trace file documenting the API call and parameters (step 44). Next, the API is called with the specified parameters (step 46) and the TRACE flag is again checked for an asserted condition (decision 48) and if the TRACE flag is set, a line is written in the trace file documenting the API return value as a comment (step 50). Until the system is shut down (step 52), any supported API calls will generate call and return documentation lines in the trace file.

While the invention has been particularly shown and described with reference to the preferred embodiment thereof, it will be understood by those skilled in the art that the foregoing and other changes in form, and details may be made therein without departing from the spirit and scope of the invention.

What is claimed is:

1. A system, comprising a processor coupled to a memory for storing program instructions for execution by the processor, wherein the program instructions comprise program instructions for:
    controlling execution of an instruction stream that invokes a sequence of high-level procedures automatically and without user intervention, wherein the executable instruction stream is a binary instruction stream and the invocation of the sequence of high-level procedures is a sequence of function calls performed by the executable instruction stream; and
    generating a trace file during execution of the executable instruction stream that represents invocations of the high-level procedure invocations as a human-readable script that can be executed to repeat the invocation of the sequence of high-level procedures, wherein the trace file is generated such that return parameters supplied from the high-level procedures to the executable instruction stream are documented in the trace as comments;
    editing the trace file to alter a behavior specified by the trace file to alter the sequence of the high-level procedures; and
    responsive to a subsequent command, executing the trace file as a script to reproduce at least part of the behavior of the executable instruction stream as modified by the editing of the trace file.

2. The system of claim 1, wherein the program instructions for generating are trace file-generating instructions embedded within the high-level procedures.

3. The system of claim 1, further comprising program instructions for: receiving a call at one of the high-level procedures;
    determining whether or not a configuration parameters set indicating that the trace file should be generated;
    responsive to determining that the configuration parameter is set, performing the generating; and
    responsive to determining that the configuration parameter is not set, skipping the generating.

4. The system of claim 1, further comprising program instructions for receiving a sequence of user input commands invoking the high-level procedures via a command interface, wherein the program instructions for controlling execution of the executable instruction stream are executed in response to the sequence of user input commands, and wherein the program instructions for generating generate a record of the sequence of user input commands that is subsequently repeated by the program instructions for executing controlling execution of the trace file.

5. The system of claim 4, wherein the program instructions for receiving further cause execution of the program instructions for executing controlling execution of the trace file in response to receiving a command that specifies the trace file as a command script.

6. The system of claim 1, wherein the high-level procedures are procedures for controlling another processing system via a command port of a service processor that controls operation of the other processing system, whereby startup or maintenance operations are documented by the trace file.

7. The system of claim 1, wherein the program instructions for generating generate the trace file such that input parameters supplied to the high-level procedures by the executable instruction stream are documented in the trace file as immediate fixed values.

8. The system of claim 1, wherein the program instructions for editing insert or remove one or more representations of invocations of the high-level procedures to alter the sequence of invocations of the high-level procedures performed by executing the trace file.

9. A computer program product comprising a computer readable storage device storing program instructions for execution by a processor, the program instructions comprising:
   program instructions for controlling execution of an executable instruction stream that invokes a sequence of high-level procedures automatically and without user intervention, wherein the executable instruction stream is a binary instruction stream and the invocation of the sequence of high-level procedures is a sequence of function calls performed by the executable instruction stream; and
   program instructions for generating a trace file during execution of the executable instruction stream that represents invocations of the high-level procedure invocations as a human-readable script that can be executed to repeat the invocation of the sequence of high-level procedures, wherein the trace file is generated such that return parameters supplied from the high-level procedures to the executable instruction stream are documented in the trace file as comments;
   program instructions for editing the trace file to alter a behavior specified by the trace file to alter the sequence of high-level procedures; and
   program instructions for, responsive to a subsequent command, executing the trace file as a script to reproduce at least part of the behavior of the executable instruction stream as modified by the editing of the trace file.

10. The computer program product of claim 9, wherein the program instructions for generating are trace file-generating instructions embedded within the high-level procedures.

11. The computer program product of claim 9, further comprising program instructions for:
    receiving a call at one of the high-level procedures;
    determining whether or not a configuration parameters set indicating that the trace file should be generated;
    responsive to determining that the configuration parameter is set, performing the generating; and
    responsive to determining that the configuration parameter is not set, skipping the generating.

12. The computer program product of claim 9, further comprising program instructions for receiving a sequence of user input commands invoking the high-level procedures via a command interface, wherein the program instructions for controlling the execution of the executable instruction stream are executed in response to the sequence of user input commands, and wherein the program instructions for generating generate a record of the sequence of user input commands that is subsequently repeated by the program instructions for executing controlling the execution of the trace file.

13. The computer program product of claim 12, wherein the program instructions for receiving further cause execution of the program instructions for executing of the trace file in response to receiving a command that specifies the trace file as a command script.

14. The computer program product of claim 9, wherein the high-level procedures are procedures for controlling another processing system via a command port of a service processor that controls operation of the other processing system, whereby startup or maintenance operations are documented by the trace file.

15. The computer program product of claim 9, wherein the program instructions for generating generate the trace file such that input parameters supplied to the high-level procedures by the executable instruction stream are documented in the trace file as immediate fixed values.

16. The computer program product of claim 9, wherein the program instructions for editing insert or remove one or more representations of invocations of the high-level procedures to alter the sequence of invocations of the high-level procedures performed by executing the trace file.

* * * * *